3,197,415
METHOD OF STRIPPING ADSORBED HYDROCARBONS FROM AN ADSORPTION BED
Lloyd T. Hendrix, Santa Ana, Calif., assignor to Richfield Oil Corporation, Los Angeles, Calif., a corporation of Delaware
Filed Oct. 10, 1961, Ser. No. 144,203
9 Claims. (Cl. 252—411)

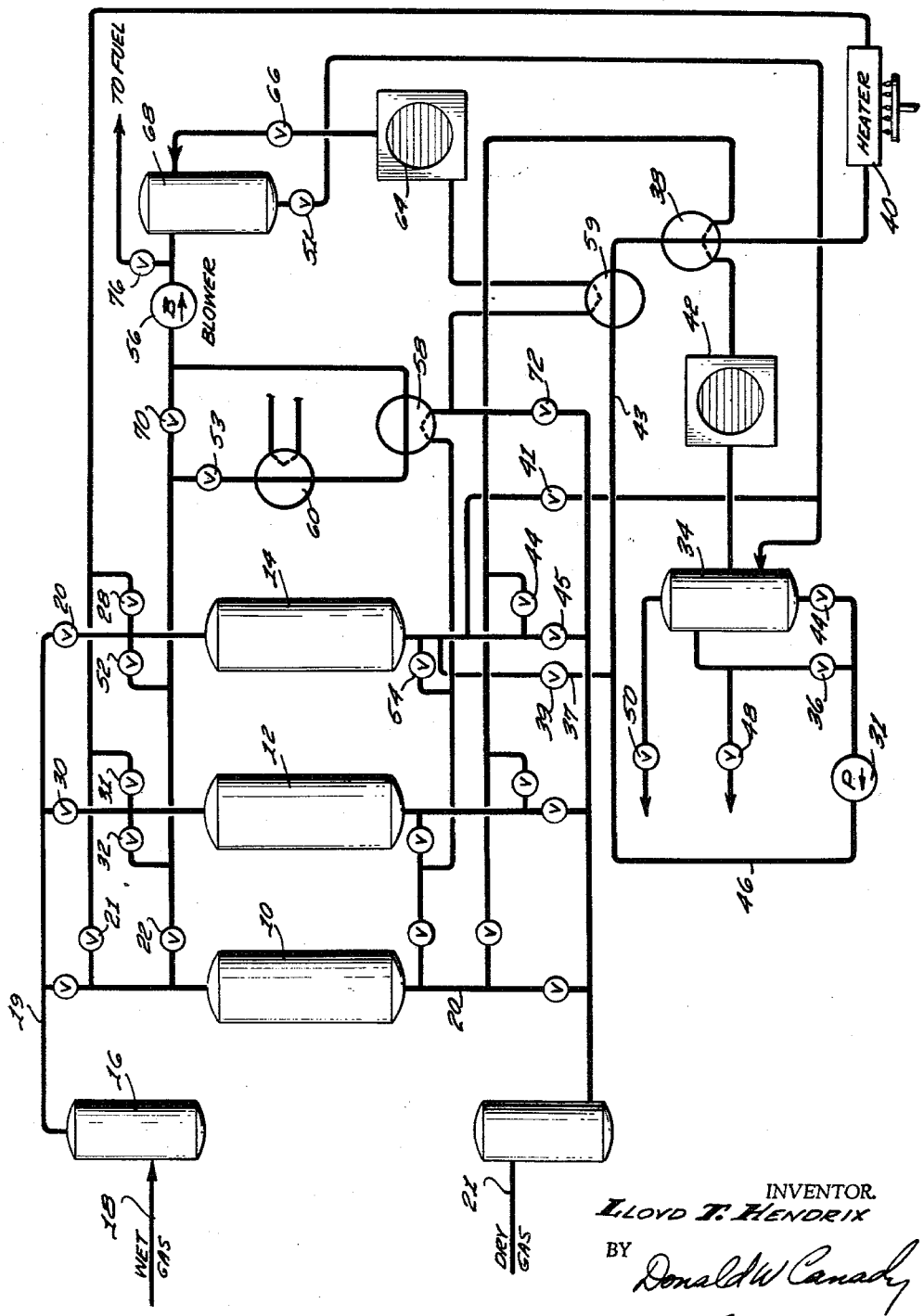

The present invention relates to a process for recovering gasoline from a natural gas stream by absorption, and more particularly relates to a method for stripping adsorbed hydrocarbons from the adsorption bed.

Adsorption is widely used as a method for recovering heavier hydrocarbons from a natural gas stream. The recovered or adsorbed heavy hydrocarbons are conventionally removed from silica gel adsorption beds by heating a dry natural gas stream and passing the heated gas through the adsorption bed to remove or strip the adsorbed heavier hydrocarbons. The expression "heavy hydrocarbons" is herein used to describe liquifiable hydrocarbons recovered for sale as liquid hydrocarbons which generally includes propane and heavier hydrocarbons. "Dry" natural gas is natural gas from which the heavy hydrocarbons have been removed and a "wet" natural gas is one having heavy hydrocarbons therein. When the natural gas streams are rich in heavy hydrocarbons, the amount of stripping gas used to remove the adsorbed hydrocarbons from such adsorption beds is excessive. For example, on a typical wet natural gas approximately 13 million cubic feet of stripping gas must be recycled per 20 million cubic feet of natural gas processed. Consequently, silica gel beds are not normally used for recovering propane and heavier hydrocarbons from natural gas containing more than about one gallon of heavier hydrocarbons per 1000 cubic feet of gas.

When the natural gas is rich in heavy hydrocarbons, the heavy hydrocarbons adsorbed on the adsorption bed can be more economically stripped with steam. Steam is widely used to regenerate charcoal adsorption beds, however at the present time this most economical method for stripping the heavy hydrocarbons from adsorption beds is not practiced on silica gel beds since steam cannot be utilized along to strip silica gel adsorption beds as the condensation of steam on the bed causes the silica gel to explode or fragment. However, superheated steam cannot condense on the silica bed if the bed is pre-heated to approximately the water saturation temperature of the steam, thus when the bed has been pre-heated to approximately the water saturation temperature of the steam, steam can then be used to displace the adsorbed heavy hydrocarbons on the silica gel bed, since the adsorption of steam onto the bed does not fragment the silica gel bed. The adsorption of steam onto the bed produces water particles in the capillaries of the silica gel bed, which displaces the adsorbed hydrocarbons. In the prior art, adsorption beds were heated indirectly in order to recover adsorbed propane and butane from the bed, however these indirect methods are less economical than the direct method utilized by the present invention.

Accordingly it is a prime object of the present invention to provide a method for regenerating silica gel adsorption beds by steam stripping.

It is also an object of the present invention to provide a process for stripping adsorption beds utilized to remove heavy hydrocarbon from a natural gas stream by initially pre-heating the adsorption bed and subsequently stripping the adsorption bed with steam, thus permitting direct condensation of the hydrocarbons displaced which in turn makes possible high recovery of ethane and heavier hydrocarbons, even from gases rich in these hydrocarbons.

It is a further object of my present invention to provide a process from regenerating adsorption beds utilized to remove heavy hydrocarbons from a natural gas stream whereby the bed is directly pre-heated and subsequently regenerated.

It is a further object of my present invention to provide a process and apparatus for recovering heavy hydrocarbons from a natural gas stream by adsorption and subsequently regenerating the adsorption bed by steam stripping whereby the recovered heavy hydrocarbons are utilized to pre-heat the adsorption beds prior to steam stripping.

It is also an important object of the present invention to provide a process for regenerating an adsorption bed whereby a high recovery of the hydrocarbons is effected.

It is also an object of the present invention to provide a process for desorbing an adsorption bed whereby the displaced hydrocarbons can be recovered by direct condensation.

Other objects and a more complete understanding of my present invention may become apparent by reference to the following specification and the appended claims taken in conjunction with the accompanying drawing wherein a flow diagram representing a process embodying my present invention is shown.

Briefly stated, my present invention relates to a method for recovering heavy hydrocarbons from a wet natural stream by adsorption on silica gel and subsequently stripping the adsorbed gasoline from the adsorption bed by first heating and vaporizing a recycled heavy hydrocarbon or gasoline stream and passing the heated hydrocarbon vapors through the adsorption bed to pre-heat the adsorption bed to a temperature above which steam will condense at the particular regenerating pressure, and then passing superheated steam through the adsorption bed to strip the adsorbed hydrocarbons therefrom and subsequently separating the steam from the stripped hydrocarbons by decantation after the steam and the hydrocarbons have been condensed.

Referring generally to the flow diagram the wet gas being processed enters the system through line 18, passes through the on-stream adsorber (10, as the process is herein described) and emerges therefrom as dry gas through line 21. One of the off-stream adsorbers, e.g. 14, is regenerated, that is, the adsorbed hydrocarbons removed from the adsorber bed, by first pumping a portion of the recovered liquid hydrocarbons through a heater (40) where they are heated to approximately the saturation temperature of the steam and then passing the heated hydrocarbons through the adsorber being regenerated, e.g., 14, to pre-heat the bed to a temperature above the saturation temperature of the steam, after which steam is automatically pumped through the adsorber to thereby steam-strip the adsorber bed by displacement. The adsorbed steam (water) is then purged from the adsorption bed 14 by cycling heated gas through the bed 14 and thereafter cooling the bed to room temperature by passing un-heated dry gas therethrough.

Referring more particularly now to the drawing, three adsorption units, 10, 12, and 14, are utilized alternately so that while one adsorber is on stream another is being regenerated and the third is cooling. Wet gas to be processed enters the system through line 18 and scrubber vessel 16 and passes through line 19 to the on-stream adsorber 10 where the heavier hydrocarbons are adsorbed from the natural gas so that a dry natural gas leaves the adsorber 10 through line 20 and filter 22. Since the regeneration or desorbing process involves heating the adsorber bed it is necessary to cool the adsorber following regeneration before it is used for adsorption again. Thus it will be considered that adsorber 10 is on stream while 12 is being cooled and 14 regenerated. Thus the regeneration process will be described with respect to adsorber 14.

During regeneration with valve 20 and 39 open and valves 26, 28 and 30 closed, liquid hydrocarbons are pumped from tank 34 into the adsorber 14 through line 37 to initially displace gas from the bed through line 19 and into the on stream absorber. This is accomplished by pump 31 taking suction through valve 36. Natural gas at operating pressures of up to 1500 p.s.i.a. is preferably displaced from the bed by pressurizing liquid hydrocarbons to the gas pressure and pumping the hydrocarbons through the bed to displace the gas. When the bed being prepared for regeneration is full of liquid, a liquid level controller operates to shut valves 20 and 39 and open valves 41, 28 and 30 to thus permit the draining of the liquid hydrocarbons from the bed, after which the pressure thereon may be released and the hydrocarbons passed into scrubber 34. A low level liquid controller closes valve 41.

Valve 28, when opened, admits heated vaporized heavier hydrocarbons which are pumped from the surge of two phase scrubber 34 with pump 31 through line 43, heat exchanger 38, and fired heater 40. Thus liquid hydrocarbons are pumped from tank 34 through line 46 simultaneously through line 37 for displacement of gas from the bed and through line 43 for heating in heater 40 and subsequently pre-heating the bed 14, although valve 28 is preferably not opened to admit heated hydrocarbons to the bed until the displacement liquid has been drained from the bed. The heated hydrocarbon vapors are thus used to pre-heat the adsorber bed 14 preparatory to the removal of absorbed hydrocarbons therefrom, to approximately the water saturation temperature of the steam which, of course, varies with the pressure at which the system is operated. Preferably, however, the liquid hydrocarbons are heated to approximately 400° F., passed into the adsorber 14 and out through valve 30 and into heat exchange relationship with the liquid hydrocarbons which are being heated and vaporized to pass into the adsorber bed. After exchanging heat with the incoming liquid hydrocarbon in heat exchanger 38, the liquid hydrocarbons from the adsorber are further cooled in a suitable cooler, such as the aerial cooler 42, after which the liquid hydrocarbons are returned to the scrubber-surge tank 34.

This cycle is repeated until the temperature of the bed reaches approximately 350° F. at which time temperature responsive valve 36 closes and valve 44 opens to allow pump 34 to take suction through valve 44 and pump water off of the two phase scrubber-surge vessel 34 and thence through line 46 to heat exchanger 38 and heater 40 where it is heated to produce superheated steam and then passed through valve 28 into the adsorber 14 where it strips the preheated adsorber bed of heavy hydrocarbons and returns to the surge tank 34 through valve 30, heat exchanger 38, and aerial cooler 42.

The liquid hydrocarbons are used not only to preheat the adsorber bed 14, but also to strip a certain amount of the adsorbed hydrocarbons from the adsorber bed. The steam, however, completely strips the adsorbed hydrocarbons from the adsorber bed 14. The stripped hydrocarbons are condensed in exchanger 38 and cooler 42 with the steam and are recovered in scrubber vessel 34 and may be then used as the pre-heating liquid hydrocarbons or recovered through the liquid level control valve 48 and transmitted to storage or fractionation facilities. Vapor release from the surge tank 34 is controlled through a back pressure control valve 50 which maintains a constant pressure in the scrubber vessel so that uncondensed vapors can be removed.

When the outlet from the adsorber being regenerated reaches a temperature of 400° F. indicating that steam is coming through the adsorber, the pump 31 shuts down and valves 28 and 30 close, and valves 52, 53 and 54 open. The steam is purged from the adsorber bed with dry natural gas. The blower 56 circulates this gas through the heat exchanger 58 and heater 60, so that the dry gas can be heated to approximately 400° F. prior to passing into the adsorber to strip the adsorbed water (steam). The dry gas has to be heated so that the steam (water) can be stripped from the adsorber bed in order to produce a sufficiently high partial pressure of water in the gas so that when the gas passes through the bed it will strip the water down to a sufficiently low residual on the silica gel so as not to impair the capacity for adsorbing hydrocarbons For example it will strip the water down to about 1% by weight of the adsorbent The heated dry gas passes through valves 53 and 52 and into the adsorber bed 14 where it purges the steam from the adsorber bed and thence the gas-steam mixture flows through valve 54 and heat exchanger 58 and thence to an aerial type cooler 64 where it is cooled and the water condensed. The gas-water mixture is then passed through valve 66 into a scrubber 68 where the condensed water is removed from the gas. The dry gas is then recycled with blower 56 into the adsorber 14 until the temperature from adsorber reaches 400° F. When the outlet temperature of the dry gas from the adsorber 14 reaches 400° F., the valve 53 closes and valves 70 and 72 open for a short time to charge the system with dehydrated gas through line 74 while, at the same time, valve 76 opens to bleed off purged gas to fuel. Thus the gas is then allowed to by-pass the heater 60 so that the adsorber bed 14 can be cooled. The gas will now be circulated by the blower 56 through valves 70 and 52, adsorber 14 and valve 54 to exchanger 58 (which is not exchanging at this point), then through exchange 59 (which is exchanging), cooler 64 and scrubber 68, and so on until the temperature of the adsorber bed reaches approximately 150° F.

The temperature to which the silica gel-adsorber bed must be heated to avoid condensation of steam thereon varies with the regeneration pressure. It is desirable to regenerate at a sufficiently high pressure to permit condensation of propane with water or air cooling. Roughly speaking, propane may be condensed by water cooling if the pressure is about 150 p.s.i.g. or more and propane may be condensed by air cooling if the system is operated at about 200 p.s.i.g. At lower pressures, refrigeration is required and although my present process may be conducted at lower pressures which would require refrigeration to condense propane, it is considered economical to operate the regeneration at higher pressure, that is, sufficiently high to condense propane with either air or water cooling. On the other hand, at higher regenerating pressures, i.e. over about 200 p.s.i.a. it becomes uneconomical to heat the steam to higher temperatures and the bottoms may not be vaporized as easily.

The water saturation temperature of steam at various pressures is as follows:

| P.s.i.a. | Saturation temperature, ° F. |
| --- | --- |
| 100 | 327.81 |
| 120 | 341.25 |
| 140 | 355.02 |
| 150 | 358.42 |
| 200 | 381.79 |
| 225 | 391.79 |
| 250 | 400.95 |

Thus, the adsorber bed in my present process must be heated to approximately the above temperature corresponding with the operating gas pressure. For example, at a regeneration pressure of 200 p.s.i.g., the vaporized recovered product used to pre-heat the bed should be heated to at least 380° F. before stripping with superheated steam.

As an example of my present invention, a silica gel adsorption bed used to process a wet natural gas at 500 p.s.i.g., having the analysis shown in Table I is stripped of essentially 100% of the adsorbed hydrocarbons by preheating the bed (at 200 p.s.i.g.) to approximately 400° F. with vaporized recovered hydrocarbons and stripping the bed with approximately 10% by weight of the bed superheated steam at 400° F. and 200 p.s.i.g.

TABLE I

*Analysis of feed gas*

| Component | Mole percent | Gal./MCF |
|---|---|---|
| $CO_2$ | 0.22 | |
| $C_1$ | 86.84 | |
| $C_2$ | 6.89 | |
| $C_3$ | 3.74 | 1.031 |
| $iC_4$ | 0.59 | 0.193 |
| $nC_4$ | 1.02 | 0.322 |
| $iC_5^+$ | 0.70 | 0.273 |

The recovered hydrocarbons were condensed by aerial cooling. The amount of steam utilized was approximately 10% by weight, of the bed and the cycle was repeated after cooling with a 140° F. cooling gas, without substantial degradation of the bed. The product gas from the adsorption bed contained 92.65 mole percent methane and 7.35 mole percent ethane. The water and $CO_2$ were removed from the gas by the adsorption bed.

Although I have described my present invention with a certain degree of particularity in order to set forth the best known manifestation of my present invention, it is to be understood that the scope of my invention is not to be so limited, but should be afforded the entire breadth of the appended claims.

I claim:

1. In a method for regenerating an adsorption bed subject to damage when steam is condensed thereon utilized to recover liquifiable hydrocarbons from a wet natural gas at a pressure of at least 150 p.s.i.a., the improvement comprising:
preheating recycled liquid hydrocarbons to approximately at least the steam saturation temperature at the regenerating pressure,
passing said preheated hydrocarbons through said adsorption bed to preheat said bed to approximately at least said steam saturation temperature, and
subsequently passing superheated steam through said bed to strip adsorbed hydrocarbons from said bed at a temperature of at least said steam saturation temperature.

2. In a method for regenerating a silica gel adsorption bed utilized to recover liquifiable hydrocarbons from a wet natural gas at a pressure of at least 150 p.s.i.a., the improvement comprising:
preheating recycled liquid hydrocarbons to a temperature above the steam saturation temperature at the regenerating pressure, passing said preheated hydrocarbons through said adsorption bed to preheat said bed to a temperature above said steam saturation temperature, and
subsequently passing superheated steam through said bed to strip adsorbed heavy hydrocarbons from said bed at a temperature of at least said steam saturation temperature.

3. In a method for regenerating a silica gel adsorption bed utilized to recover liquifiable hydrocarbons from a wet natural gas at a pressure of at least 150 p.s.i.a., the improvement comprising:
preheating recycled liquid hydrocarbons to at least the steam saturation temperature at the regenerating pressure, passing said preheated liquid hydrocarbons through said bed to preheat said adsorption bed to at least said steam saturation temperature,
passing superheated steam through said bed to strip adsorbed heavy hydrocarbons therefrom at a temperature of at least said steam saturation temperature, and displacing steam from said adsorption bed with a dry natural gas stream.

4. In a method for regenerating a silica gel adsorption bed utilized to recover liquifiable hydrocarbons from a wet natural gas at a pressure of at least 150 p.s.i.a., the improvement comprising:
preheating recycled liquid hydrocarbons to at least the steam saturation temperature at the regenerating pressure, passing preheated liquid hydrocarbons through said bed to preheat said adsorption bed to at least said steam saturation temperature and recover a portion of the adsorbed hydrocarbons from said bed,
passing superheated steam through said bed to strip adsorbed heavy hydrocarbons therefrom at a temperature of at least said steam saturation temperature, and displacing steam from said adsorption bed with a dry natural gas stream.

5. In a method for regenerating a silica gel adsorption bed utilized to recover liquifiable hydrocarbons from a wet natural gas stream at a pressure of at least 150 p.s.i.a., the improvement comprising:
pre-heating recycled liquid hydrocarbons to a temperature above the steam saturation temperature at the regeneration pressure,
passing said pre-heated hydrocarbons through said adsorption bed to pre-heat said bed to a temperature above said steam saturation temperature and strip a portion of the adsorbed hydrocarbons from said bed,
passing super-heated steam through said bed to strip said adsorbed hydrocarbons from said bed at a temperature of at least said steam saturation temperature,
condensing said steam and said stripped hydrocarbons, and decanting the condensed water from said stripped hydrocarbons.

6. In a method for regenerating a silica gel adsorption bed utilized to recover propane and heavier hydrocarbons from a wet natural gas stream at a pressure of at least 150 p.s.i.a., the improvement comprising:
preheating recycled propane and heavier hydrocarbons to a temperature above the steam saturation temperature at the regeneration pressure,
passing said pre-heated hydrocarbons through said adsorption bed to pre-heat said bed to a temperature above said steam saturation temperature and strip a portion of adsorbed hydrocarbons from said bed,
passing superheated steam through said bed to strip said adsorbed hydrocarbons from said bed at a temperature of at least said steam saturation temperature,
condensing said steam and said stripped hydrocarbons, and recovering said stripped hydrocarbons from said steam condensate.

7. In a method of regenerating a silica gel adsorption bed at a pressure of from 150 to 250 p.s.i.a. utilized to recover liquifiable hydrocarbons from a wet natural gas stream, the improvement comprising:
preheating recycled liquid hydrocarbons to a temperature of at least 350° F.,
passing said preheated hydrocarbons through said adsorption bed to preheat said bed to at least 350° F. and strip a portion of the adsorbed hydrocarbons from said bed,
passing super-heated steam through said bed to strip said adsorbed hydrocarbons from said bed,
condensing said steam and said stripped hydrocarbons and recovering said stripped hydrocarbons from said steam condensate.

8. In a method for regenerating a silica gel adsorption bed at a pressure of 200 p.s.i.a. utilized to recover liquifiable hydrocarbons from a wet natural gas stream, the improvement comprising:
preheating recycled liquid hydrocarbons to a temperature of approximately 380° F., passing said preheating hydrocarbons through said adsorption bed to preheat said bed to approximately 380° F. and strip a portion of the adsorbed hydrocarbons from said bed, passing superheated steam through said bed to strip said adsorbed hydrocarbons from said bed, condensing said steam and said stripped hydrocarbons, and recovering the stripped hydrocarbons from said steam condensate.

9. Apparatus for regenerating a silica gel adsorption bed utilized to recover liquifiable hydrocarbons from a wet natural gas stream, the improvement comprising in combination:

means for preheating recycled liquid hydrocarbons, means for passing said preheated hydrocarbons through said adsorption bed to preheat said bed to a temperature above the steam saturation temperature, means for passing superheated steam through said bed to strip said adsorbed hydrocarbons from said bed, and means for recovering said stripped hydrocarbons from said steam.

References Cited by the Examiner

UNITED STATES PATENTS 2,574,434 11/51 Greentree et al. _____ 208—305
2,585,491 2/52 Olsen _____ 260—676

MAURICE A. BRINDISI, *Primary Examiner.*

ALPHONSO D. SULLIVAN, *Examiner.*